T. PRENTICE.
BORING AND DRILLING TOOL.
APPLICATION FILED MAY 3, 1912.
1,052,423.
Patented Feb. 4, 1913.
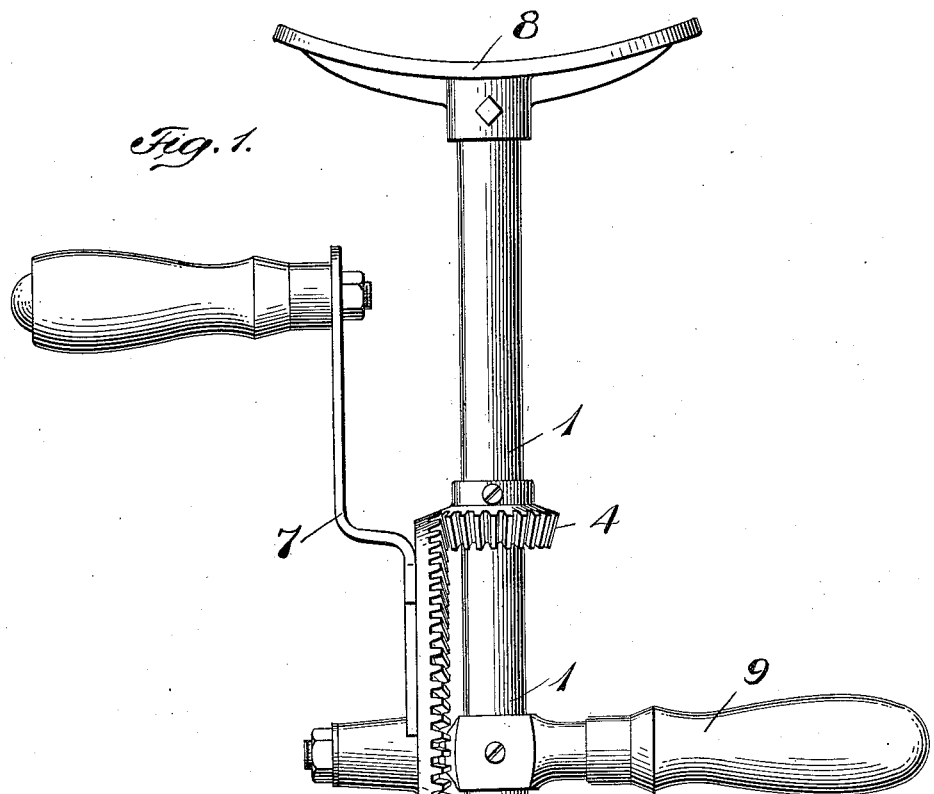
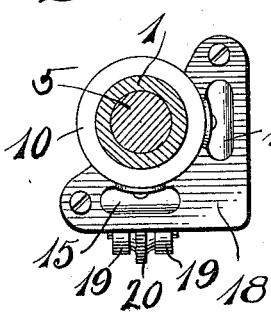
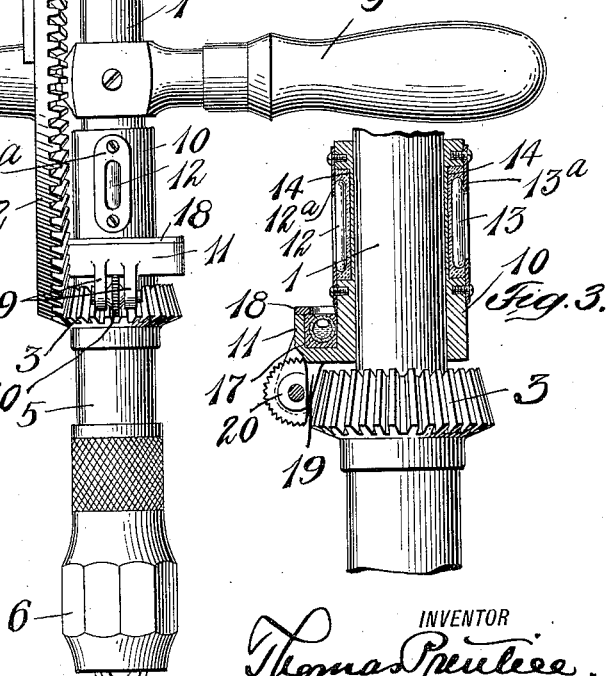
WITNESSES:
INVENTOR
ATTORNEYS

UNITED STATES PATENT OFFICE.

THOMAS PRENTICE, OF BRIDGEPORT, CONNECTICUT, ASSIGNOR TO THE STANLEY RULE & LEVEL COMPANY, OF NEW BRITAIN, CONNECTICUT, A CORPORATION OF CONNECTICUT.

BORING AND DRILLING TOOL.

1,052,423.

Specification of Letters Patent. Patented Feb. 4, 1913.

Application filed May 3, 1912. Serial No. 694,986.

*To all whom it may concern:*

Be it known that I, THOMAS PRENTICE, a citizen of the United States, residing at Bridgeport, Fairfield county, State of Connecticut, have invented certain new and useful Improvements in Boring and Drilling Tools, of which the following is a full, clear, and exact description.

This invention has for its object the provision of means whereby the person operating a boring or drilling tool may accurately and without assistance position the tool for vertical or horizontal work, and whereby he may be advised if the tool remains in proper alinement during the progress of the work.

More specifically, the invention consists in the provision of a manually controlled tool of the character described, having level glasses mounted thereon and positioned in the line of vision of the operator during vertical or horizontal drilling operations.

In the drawings, I am illustrating the invention as applied to a breast drill as being typical of the type of drill which is manually controlled. In drills of this character, it has been heretofore the custom for the operator to either guess at the proper alinement of the tool or to have some other person "sight" the drill for him. My invention as applied to a drill of this character, therefore, illustrates most clearly its scope and utility.

In the drawings: Figure 1 is a view in front elevation of a conventional form of breast drill provided with the position indicating means forming the subject matter of my invention. Fig. 2 is a top plan view of the device forming a preferable embodiment of my invention and mounted on the shank of the drill, said shank being shown in section. Fig. 3 is a vertical sectional view of this device, the parts of the drill itself being shown in elevation.

Referring to the drawings by numerals, 1 indicates the stationary body portion or shank of a drill and 2—3 the driving gear elements thereof, an idler gear 4 being revolubly mounted upon the shank 1 in engagement with the operating gear 2. At its lower end, the drill is provided with the usual rotating drill spindle 5 carrying a bit clamp 6. Connected to the driving gear 2 is an operating crank handle 7. At its upper end, the shank portion of the drill is provided with a curved breast rest 8 of usual construction and a supporting and guiding handle 9 is provided centrally of the drill and extends laterally from the shank thereof. The parts so far described are merely those of the standard type of drill in use at the present time.

Mounted on the stationary shank of the drill at any suitable portion thereof, such, for instance, as shown in the drawings, is a sleeve 10 provided at its lower end with an angular offset extension 11 forming substantially a right angular offset. Mounted in recesses 14 extending longitudinally of the sleeve 10, and suitably incased therein as shown, are level glasses 12 and 13 located at diametrically opposite points on the sleeve 10 and provided with cover plates 12ª and 13ª respectively suitably slotted to disclose the level glass and seated thereover and secured to the sleeve.

The upper face of the angular extension 11 is provided with recesses 17 arranged substantially at right angles to each other and tangential to the sleeve 10. Suitably incased level glasses 15—16 are mounted in these recesses, these level glasses likewise being arranged and extending in planes at right angles to each other, tangential to the sleeve 10 and extending laterally of said sleeve. A cover plate 18 conforming in shape to the offset extension 11 is seated over the face thereof and secured thereto, suitable slots being formed in said cover plate to disclose the level glasses 15—16.

The level carrying sleeve is preferably positioned upon the shank 1 to bring its level glasses 12—13 in the line of vision of the operator during horizontal drilling operation, this position depending upon the relative positions of the parts of the drilling tool. The use of these level glasses during the operation of the tool is as follows: Assuming that the drill is extending horizontally in the position shown in Fig. 1 of the drawings and being operated by a right-handed person. The level glass 12 carried by the sleeve 10 will be so positioned as to lie in the downward line of vision of the operator as he holds the tool against the part to be drilled or bored. If the tool is operated by a left-handed operator, the operating handle will, of course, be moved to be on the left hand side of the tool, and in this position the level glass 13 will be in his line of vision.

In vertical drilling operation, the two level glasses 15—16 will coöperate to enable the operator to accurately position the drill for vertical work. The inner edges of these level glasses are alined approximately with the outer surface or periphery of the sleeve 10 so that the sleeve and the levels carried thereby will not interfere with the vision of the operator as he glances down. The two level glasses 15—16, being arranged at and substantially forming a right angle, will coöperate and enable the drill to be positioned absolutely vertical, the coincidence of the bubbles at the center of each glass marking such vertical position.

From the foregoing, it will be evident that the device forming the subject-matter of the present invention is of great utility in promoting accuracy of drilling or boring operation in a tool of this character. Its specific construction may be modified and departed from in adapting it to drilling tools of varying structure, but such modification and adaptation is within the spirit of the present invention and of the appended claims.

In the drawings, I have shown the angular off-set portion 11 provided with depending ears 19 between which is pivotally mounted a gear latch 20. The sleeve 10 may be mounted upon the stationary shank of a drilling tool with its end in proximity to a gear element so that the latch member 20 may be thrown in to engage the teeth of said gear element and lock the actuating mechanism of the drill against movement.

What I claim, therefore, and desire to secure by Letters Patent is:

1. In a boring and drilling tool embodying a stationary shank portion and a rotating tool-operating spindle, a sleeve fixedly mounted on said stationary shank having an offset portion extending at substantially right angles therefrom, said sleeve having a recess therein extending longitudinally thereof and having complemental level glasses carried by its lateral offset at substantially right angles to each other, and a level glass mounted in said longitudinal recess, said longitudinally extending level glass and those carried by the offset lying in different planes.

2. In a boring or drilling tool embodying a stationary shank portion and a rotating tool-operating spindle, a sleeve mounted on said stationary shank having an offset portion extending at substantially right angles therefrom, said sleeve having recesses therein at diametrically opposite points extending longitudinally thereof and having complemental recesses formed in its offset portion extending substantially at right angles to each other, and level glasses mounted in said recesses, said longitudinal and offset-carried level glasses lying in different planes.

3. In a boring and drilling tool embodying a stationary shank portion and a rotating tool-operating spindle, a sleeve mounted on said stationary shank having an integral offset portion extending transversely and at substantially right angles therefrom, said sleeve having recesses therein at diametrically opposite points extending longitudinally thereof, and having complemental recesses formed in its offset portion at substantially right angles to each other and tangential to said sleeve, level glasses mounted in said recesses, the level glasses of the longitudinally extending recesses lying in different planes from said tangential level glasses whereby said glasses extend in different planes of vision of the operator.

THOMAS PRENTICE.

Witnesses:
J. M. BURDICK,
CHARLES E. ZINK.

---

Copies of this patent may be obtained for five cents each, by addressing the "Commissioner of Patents, Washington, D. C."